United States Patent [19]
Araki

[11] 3,854,811
[45] Dec. 17, 1974

[54] DELAY MECHANISM FOR A SINGLE LENS REFLEX CAMERA MIRROR DRIVE

[75] Inventor: Kunihiko Araki, Yokohama, Japan

[73] Assignee: Ricoh Co. Ltd., Tokyo, Japan

[22] Filed: Nov. 21, 1973

[21] Appl. No.: 417,933

[30] Foreign Application Priority Data
Nov. 30, 1972   Japan.............................. 47-120444
Nov. 30, 1972   Japan.............................. 47-120445

[52] U.S. Cl................................ 354/153, 354/270
[51] Int. Cl....................................... G03b 19/12
[58] Field of Search........... 354/153, 152, 204, 205, 354/270, 271, 272

[56] References Cited
UNITED STATES PATENTS

| | | | |
|---|---|---|---|
| 3,474,715 | 10/1969 | Nakamura | 354/153 |
| 3,580,154 | 5/1971 | Ettischer | 354/153 |
| 3,680,458 | 8/1972 | Nomura | 354/272 |

*Primary Examiner*—Richard L. Moses
*Attorney, Agent, or Firm*—Cooper, Dunham, Clark, Griffin & Moran

[57] ABSTRACT

A single lens reflex camera having an electrical shutter, which operates on the light transmitted through a taking lens, and a diaphragm operating member and a mirror drive member, which are cocked by the film winding operation and freed upon depression of a release button, and also including a delay unit to delay the operation of the diaphragm operating member or the mirror drive member so that measurement of the light transmitted through the taking lens is permitted following focussing and after the diaphragm aperture has been stabilized subsequent to the setting operation of the unit, the camera including a storage for the photometric value.

10 Claims, 8 Drawing Figures

DELAY MECHANISM FOR A SINGLE LENS REFLEX CAMERA MIRROR DRIVE

BACKGROUND OF THE INVENTION

The invention relates to a single lens reflex camera including an electrical shutter with a TTL (through-the-lens) photometry system, that is, operating on the light transmitted through the taking lens, and in which the diaphragm is instantaneously operated to a given value prior to the photometry.

A single lens reflex camera with TTL photometry system includes a movable reflecting mirror, disposed at an inclination between the taking lens and the film surface in order to guide the light transmitted through the taking lens along a light path to a finder, whereby an image which is completely identical with the image to be taken is focused at a position conjugate with the film surface by viewing through an eyepiece and a pentaprism.

When an electrical shutter is to be incorporated in such a camera, a difficulty is presented by the fact that when a picture is taken, the reflecting mirror moves to open the taking light path and at the same time close the light path of the finder. The latter operation interrupts the incidence of the light upon a light receiving element which is disposed in the light path of the finder to measure the incoming light in order to determine an exposure time. To overcome this difficulty, the conventional camera is adapted to store the photometric value of the incoming light. A proper exposure period is automatically determined in accordance with the stored value when the shutter release is operated.

The TTL photometry in a single lens reflex camera constructed as mentioned above can be effected in two ways, namely, open photometry and diaphragm aperture preset photometry. The open photometry which is effected before the diaphragm aperture is set affords the advantage that the finder is sufficiently illuminated to facilitate a correct focussing of an object being photographed. However, it involves the disadvantage that an electrical or mechanical transducer element must be provided to transmit a diaphragm aperture, or F-value, to be used for taking a picture, to a photometric control circuit which is disposed on the camera body. This dictates the use of a special lens mount such as a bayonet mount. In the diaphragm aperture preset photometry, the diaphragm aperture is already set and directly available when focussing, and thus permits the use of a screw mount, but it disadvantageously requires an additional operational step for the diaphragm operation. In the conventional camera of the type described above, the operation of the diaphragm takes place either (1) by interlocking with a winding lever or diaphragm operating button prior to the operation of the shutter release, or (2) by the initial movement of the shutter release operation. However, in the first technique, the illumination within the finder will be darkened to make it difficult to locate the object being photographed as the diaphragm aperture becomes smaller, while the second technique involves the disadvantages of an increased resistance to the release operation and an increased release stroke.

If an arrangement could be made such that the diaphragm is left open to have the interior of the finder fully illuminated during the focussing and the diaphragm is instantaneously operated to a given value before the photometry, there could be achieved both the advantages of the open photometry and the diaphragm aperture preset photometry. Such a photometry system will be referred to hereinafter as an instantaneous diaphragm operating photometry system. In such a system, the diaphragm must be instantaneously operated preparatory to the photometry and subsequent to the focussing, which may give rise to the possibility that the diaphragm blades may rebound upon reaching the terminal point in the rapid operation thereof to cause a brief variation in the diaphragm aperture, thereby causing an error in the photometric value.

SUMMARY OF THE INVENTION

The present invention involves a single lens reflex camera with a TTL photometry system including an electrical shutter in which an instantaneous diaphragm operating photometry system is employed to take advantage of both photometry systems mentioned above and thus the advantage of the open photometry prevailing upon focussing and in which a delay unit is used to assure a stabilized diaphragm aperture even though the diaphragm is instantaneously operated. More particularly, a mechanical delay unit is provided to delay the operation of the diaphragm member or the mirror drive member so as to stabilize the diaphragm aperture before photometry, or an electrical delay circuit may be used to permit delayed operation of a mirror drive member until the diaphragm aperture set by the diaphragm operating member is stabilized.

In accordance with the invention, there is provided a single lens reflex camera with a TTL instantaneous diaphragm operating photometry system which, by virtue of such photometry system, permits the focussing operation to be effected in the open diaphragm condition and in which a diaphragm operating member which is cocked by the film winding operation is merely freed by depression of a release button for subsequent automatic operation, under the control of a delay unit, together with a mirror drive member such that a photometric value is determined and stored after the diaphragm aperture has been stabilized.

DETAILED DESCRIPTION OF THE PREFERRED EMBODIMENTS

Figure 1:
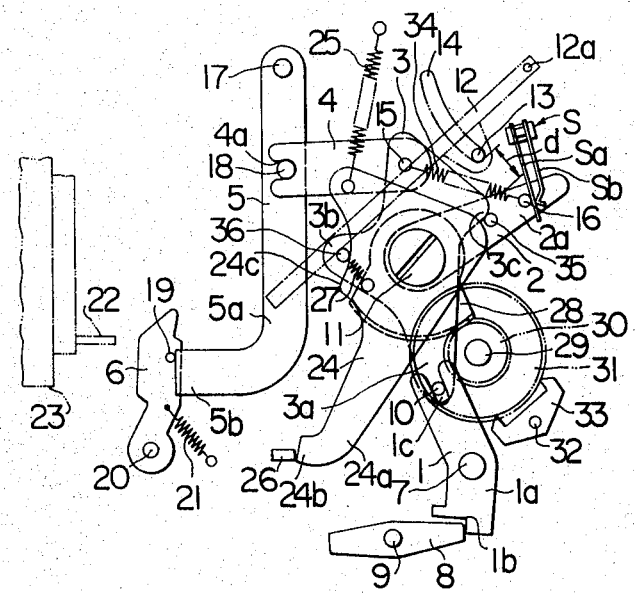
FIG. 1 is a front view of the diaphragm operating mechanism of the single lens reflex camera with TTL instantaneous diaphragm operating photometry system in accordance with one embodiment of the invention.

An embodiment including a mechanical delay unit will be described first with reference to FIG. 1 which is a front view of the diaphragm operating mechanism disposed laterally of a mirror box within a camera body. The diaphragm operating mechanism principally comprises a release lever 1, a mirror drive member 2, a diaphragm operating member 3, a connection lever 4, a diaphragm lever 5 and an auto-hinge 6. Specifically, the release lever 1 is rockably journaled on a pivot 7 externally of the side wall of the mirror box. One arm 1a of the lever 1 is formed with a notch 1b which is normally engaged by a detent 8. The detent 8 is rockably journaled on a pivot 9, and is adapted to be rocked clockwise about the pivot 9 to be disengaged from the notch 1b when a release button (not shown) is depressed.

The other arm of the lever 1 is formed with a fork 1c in its extremity, which fork fits around a pin 10 fixedly mounted on a lower extension arm 3a of the diaphragm operating member 3. The diaphragm operating member 3 is rockably journaled on a pivot 11, and its upper end is pivotally connected with the base of the connection lever 4 at pivot 15.

The base of the mirror drive member 2 is also rockably journaled on the pivot 11, and the free end 2a of the drive member 2 extends to the right, as viewed in FIG. 1. A mirror drive pin 13 integrally mounted on a movable reflecting mirror 12 which is disposed at an inclination of 45° with respect to the optical axis is located above the free end 2a, and is pushed up by the lateral edge of the free end 2a when the drive member 2 is rotated counter-clockwise about the pin 11, thereby causing the movable reflecting mirror 12 to rock clockwise about a pivot 12a against the bias applied thereto to thereby close the light path of the finder and to open the taking light path.

The mirror drive pin 13 is movable along an elongate arcuate guide slot 14 formed in the side wall of the mirror box to permit a clockwise rotation of about 45° of the movable reflecting mirror 12 about the pivot 12a. A pin 16 is fixed toward the extremity of the free end 2a of the mirror drive member 2, and is adapted to open and close a photometry trigger switch S for operating a memory circuit. Specifically, the photometry trigger switch S comprises a pair of movable contacts $S_a$, $S_b$, which are formed of resilient conductive blade members. Normally, the pin 16 urges the movable contact $S_a$, against its resilience, into contact with the movable contact $S_b$ to close the switch S, thereby rendering the photometric circuit inoperative. A tension spring 34 connects the pin 16 and the pivot 15 together. The drive member 2 is normally spaced from the mirror drive pin 13 by a spacing d, and moves substantially together with the diaphragm operating member 3 during its counter-clockwise rocking motion. The spacing d is provided for the purpose of instantaneous photometry, and the arrangement is such that the mirror drive member 2 does not push up the pin 13 immediately upon the counter-clockwise rotation of the diaphragm operating member 3. In other words, the mirror drive member 2 abuts against and pushes up the pin 13 after travelling through the spacing d. In the meantime, the diaphragm aperture setting operation as well as the instantaneous photometry are effected.

On the other hand, the connection lever 4 which is pivotally connected at pivot 15 with the upper portion of the diaphragm operating member 3 has its free end extending forwardly or to the left as viewed in FIG. 1, and is formed with a fork 4a in its extremity. The fork 4a fits around a pin 18 which is fixedly mounted on the free end 5a of the diaphragm lever 5 that is rockably journaled at its base on a pivot 17. The diaphragm lever 5 has its one end bent forwardly or to the left as viewed in FIG. 1 to form an abutment 5b, which is aligned with a pin 19 fixedly mounted on the auto-hinge 6 that is rockably mounted on a pivot 20. A tension spring 21 extends between the auto-hinge 6 and a stationary part for urging the auto-hinge 6 to rotate clockwise about the pivot 20 normally, but such rotation is prevented by the engagement of the pin 19 with the abutment 5b. When the auto-hinge 6 is rocked counter-clockwise about the pivot 20 against the resilience of the spring 21, it abuts against a diaphragm operating pin 22 which extends rearwardly, or to the right as viewed in FIG. 1, from a lens barrel 23, and operates to set the diaphragm aperture.

The pivot 11 which carries the diaphragm operating member 3 also pivotally carries a setting lever 24 which has a downwardly extending free end 24a, with an abutment 24b extending forwardly or to the left as viewed in FIG. 1 formed in its extremity. A charging spring 25 extends between the setting lever 24 and a stationary part to urge the setting lever 24 to rotate clockwise about the pivot 11. Upon film winding, the bent end 24b of the setting lever 24 is moved by a charging member 26, which is interlocked with the film winding operation, and rocks counter-clockwise about the pivot 11, whereby the spring 25 is charged so as to be able to exert its resilience when the shutter is closed.

The setting lever 24 thus constructed and the diaphragm operating member 3 are connected together through a tension drive spring 27 shich extends between the free end 24a of the setting lever and a left-hand projection 3b of the diaphragm operating member 3. The drive spring 27 is adapted to be energized as a result of the counter-clockwise rotation of the setting lever 24 at the same time as the charging spring 25 is energized.

A sector-shaped toothed wheel 28 for operating the mechanical delay unit is also journaled on the same pivot 11 as the setting lever 24, diaphragm operating member 3 and mirror drive member 2. The sector-shaped toothed wheel 28 is essentially operatively united with he diaphragm operating member 3. The sector-shaped toothed wheel 28 meshes with a gear 30 having a smaller diameter and which is rotatably journaled on a pivot 29. The gear 30 is integral with an escape wheel 31 which is also rotatably journaled on the pivot 29, the escape wheel 31 being engaged by an anchor 33 which is pivoted on a pivot 32. Tension spring 34 connects the pin 16 and the pivot 15 urging members 2 and 3 together, but a pin 35 is fixedly mounted on the mirror drive member 2 and abuts against the outer edge 3c of a bulging portion in the upper part of the diaphragm operating member 3.

In operation, as the film is wound, in the condition shown in FIG. 1, the charging member 26, which is interlocked with the winding operation, moves the abutment 24b to the right, whereby the setting lever 24 is rotated counter-clockwise about the pivot 11. This rotation is effective to energize the charging spring 25 and the drive spring 27 (see FIG. 2). In this condition, the focusing is effected while leaving the diaphragm open, and subsequently the release button is depressed. Thereupon, the detent 8 is rocked clockwise about the pivot 9 to free the release lever 1 from the constraint applied by the detent 8, thus releasing the diaphragm operating member 3. As a result, the member 3 is rotated counter-clockwise about the pivot 11 under the resilience of the charged spring 27. As it rotates, the mirror drive member 2 and the sector-shaped toothed wheel 28 also undergo a counter-clockwise rotation. The rotation of these members takes place comparatively slowly, however, by virtue of their interlocked engagement with the escape wheel 31 and the anchor 33 which constitute together a delay unit.

Figure 2:
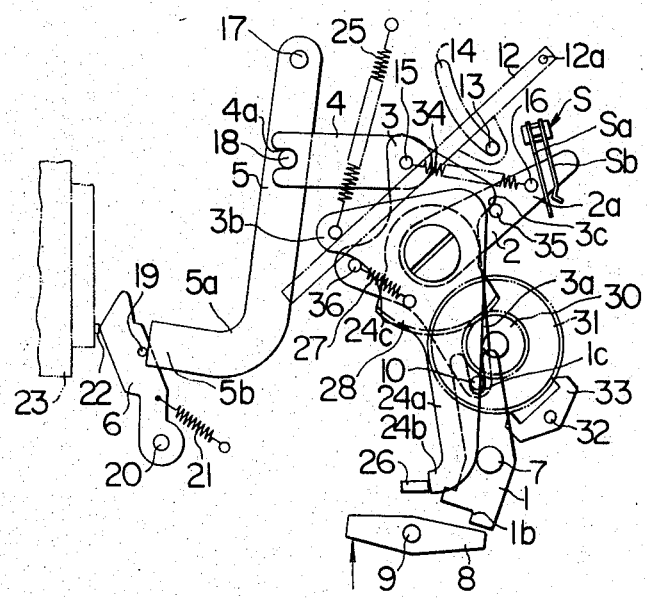
FIG. 2 is a similar view to FIG. 1 and illustrating the operation thereof.
Figure 3:
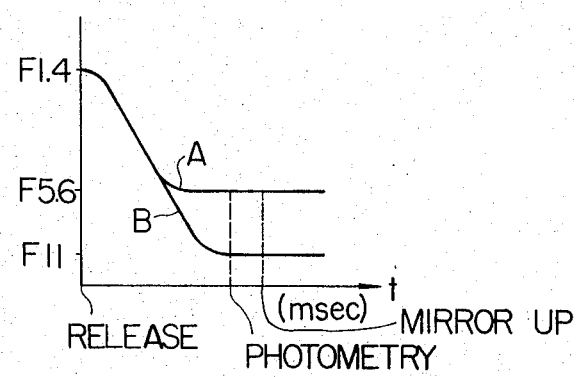
FIG. 3 shows an operational curve of the diaphragm when the diaphragm operating member is associated with a delay unit.

As the diaphragm operating member 3 rotates, it moves the pin 18 forward through the conection lever 4, whereby the diaphragm lever 5 is rocked clockwise about its pivot 17. As this lever rocks, the abutment 5b moves the pin 19 to cause a counter-clockwise rocking motion of the auto-hinge 6 about its pivot 20 against he resilience of the spring 21. As shown in FIG. 2, the rocking motion of the auto-hinge 6 is effective to push the pin 22 inward for effecting the diaphragm aperture setting for the purpose of photometry and taking a picture. The diaphragm aperture setting operation is relatively slow as a result of the diaphragm operating member 3 rotating slowly in cooperation with the delay unit. Its operation is illustrated in FIG. 3 where curves A and B represent the operations when the diaphragm aperture is set to F 5.6 and F 11, respectively. In this manner, as a short but definite period of time is required until the diaphragm aperture is set to a given value, such aperture setting operation does not induce a rebounding of the diaphragm blades. If the diaphragm aperture is set in a rapid manner, there will occur a rebounding of the diaphragm blades upon reaching the terminal point of the setting operation because of the inertia thereof, and thus there would be a certain period of time required until the diaphragm aperture is stabilized. However, when the diaphragm aperture setting operation takes place through a slow motion, the inertia involved is reduced, thereby enabling the setting operation to be terminated without a substantial rebounding of the diaphragm blades.

When the diaphragm aperture is determined in this manner, the pin 16 will have moved, as a result of the rotation of the mirror drive member 2, out of engagement with the switch contact to open the photometry trigger switch S to operate a memory circuit at the time when the diaphragm aperture setting operation is terminated or at a time slightly later than that. Thus, the photometry takes place through the stabilized diaphragm aperture while using the movable reflecting mirror 12, since the photometry occurs during the interval when the mirror drive member 2 travels through the spacing d, and thus is almost instantaneous.

When the photometry is completed, the mirror drive member 2 abuts against the pin 13 to push it up, causing the movable reflecting mirror 12 to rotate clockwise about its pivot 12a against the bias applied thereto. When the movable reflecting mirror 12 is rotated, the light path of the finder is closed, while the picture taking light path is opened. Upon completion of rotation of the movable reflecting mirror 12, the shutter release is operated, whereby the first blind of the shutter starts to run to initiate the exposure. An electrical shutter responds to the stored photometric value by determining a proper exposure time automatically in the known manner. Upon lapse of the exposure time, the electrical shutter operates to run the second blind of the shutter, thereby terminating the photographing process.

When the second blind of the shutter has run through its stroke, the constraint on the charging member 26 is released, whereby the resilience of the spring 25 which has been energized is effective to cause a clockwise motion of the setting lever 24 about the pivot 11. Thereupon, a bulging edge 24c formed in the base portion of the free end 24a of the setting lever 24 moves the pin 36 fixed on the diaphragm operating member 3 angularly, whereby the diaphragm operating member 3 is returned to its original position by a clockwise rotation about the pivot 11. As the diaphragm operating member 3 returns to its original position, the pin 35 is moved angularly by the projection 3c, whereby the mirror drive member 2 rotates clockwise about the pivot 11 to its original position in which it closes the switch S as shown in FIG. 1.

When the diaphragm operating member 3 rotates clockwise, the dorce on diaphragm lever 5 from the connection lever 4, which urged the pin 18 forwardly or to the left as viewed in FIG. 1, is removed, whereby the resilience of the spring 21 becomes effective to rock the auto-hinge 6 clockwise about its pivot 20, thereby allowing the diaphragm operating pin 22 to be returned to its original position and allowing the pin 19 to move the abutment 5b back, whereby the diaphragm lever 5 is returned to the position shown in FIG. 1.

When the mirror drive member 2 is returned to its original position, the movable reflecting mirror 12 angularly moves in a counter-clockwise direction about its pivot 12a under the action of the bias applied thereto. As the diaphragm operating member 3 turns clockwise to its original position, the release lever 1 having its fork 1c fitting around the pin 10 is rocked counter-clockwise about the pivot 7, whereby the detent 8 engages with the notch 1b thereof.

Subsequently, when the film is wound up, the charging member 26 which is interlocked therewith pushes the abutment 24b of the setting lever 24 to rock the counter-clockwise about the pivot 11, thereby extending and energizing the drive spring 27 and the charging spring 24 in preparation for the next photographing process.

While in the above embodiment, the delay unit is associated with the diaphragm operating member 3 to slow down its operation in order to prevent rebounding of the diaphragm blades which might occur upon the diaphragm aperture setting operation, the delay unit may be alternatively associated with the mirror drive member 2 to slow down its operation in the above embodiment. Specifically, while in the above description, the diaphragm operating member 3 has been made substantially integral with the sector-shaped toothed wheel 28 which operates the delay unit, the sector-shaped toothed wheel 28 may be mounted substantially integrally with the mirror drive member 2, in which case only the mirror drive member 2 will be subjected to a delayed operation, thus slowing down the operation of the mirror drive member 2.

Figure 4:
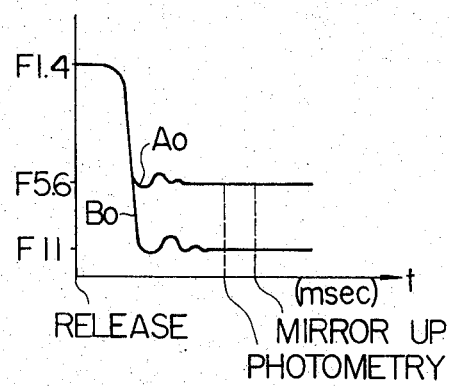
FIG. 4 shows an operational curve of the diaphragm when the mirror drive member is associated with a delay unit.

When such an arrangement is used, the operation of the diaphragm operating member 3 does not slow down and its operation will be as illustrated in FIG. 4 wherein curve Ao illustrates a diaphragm aperture setting to F 5.6 and curve Bo illustrates a diaphragm aperture setting to F 11. In these instances, the diaphragm blades will rebound upon reaching the terminal point of the diaphragm aperture setting operation. However, during the interval when such rebounding occurs, the mirror drive member 2 continues its slowed operation as a result of the operation of the delay unit, and the trigger switch S is not yet opened. The switch S will be opened and the movable reflecting mirror 12 will be driven upward only after the rebounding has ceased and the diaphragm aperture has been stabilized. In this manner, the influence of the rebounding of the diaphragm blades can equally be eliminated by delaying the operation of the mirror drive member 2. While in the above embodiment, the memory circuit has been operated by opening the photometry trigger switch S, it should be understood that this switch may be normally open and be closed to operate the memory circuit.

Another embodiment of the invention incorporating an electrical delay circuit will be described with reference to FIG. 5 which is a front view of the diaphragm operating mechanism for this embodiment and disposed laterally of the mirror box within a camera body. The diaphragm operating mechanism in this embodiment also comprises a release lever 101, a mirror drive member 102, a diaphragm operating member 103, a connection lever 104, a diaphragm lever 105 and an auto-hinge 106. Specifically, the release lever 101 is rockably journaled on a pivot 107 mounted on the outside of a side wall of the mirror box. One arm 101a of the lever 101 is formed with a notch 101b which is normally engaged by a detent 108. The detent 108 is rockably mounted on a pivot 109, and is adapted to rock clockwise about the pivot 109 to be disengaged from the notch 101b when a release button (not shown) is depressed.

The other end of the lever 101 is formed with a fork 101c which fits around a pin 110 that is fixedly mounted on a lower extension 103a of the diaphragm operating member 103. The diaphragm operating member 103 is rockably mounted on a pivot 111, and its upper portion is pivotally connected with the base of the connection lever 104 by means of a pivot 115.

Figure 5:
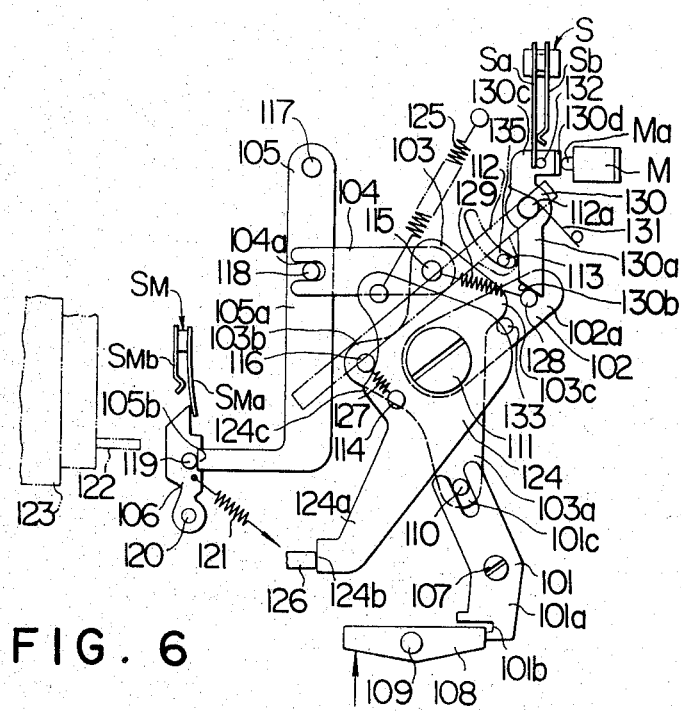
FIG. 5 is a front view of the diaphragm operating mechanism of the single lens reflex camera with TTL instantaneous diaphragm operating photometry system in accordance with another embodiment of the invention.

Also rockably mounted on the pivot 111 is the base of the mirror drive member 102 having its free end 102a extending to the right as viewed in FIG. 5. A mirror drive pin 113 is located above the free end 102a and is integrally mounted on a movable reflecting mirror 112 which is disposed at an inclination of 45° with respect to the optical axis. When the drive member 102 rotates counter-clockwise about the pivot 111, the pin 113 is pushed up by the free end 102a, whereby the movable reflecting mirror 112 rocks clockwise about its pivot 112a against the bias applied thereto, closing the light path of the finder and opening the taking light path.

The mirror drive pin 113 is adapted to move along an elongate guide slot 135 which is formed in the side wall of the mirror box in the form of an arc so that the movable reflecting mirror 112 may be rotated about 45° clockwise about its pivot 112a.

The connection lever 104, which has its one end pivotally connected with the upper portion of the diaphragm operating member 103 by means of the pivot 115, has its free end extending forwardly or to the left as viewed in FIG. 5, with a fork 104a formed in its extremity. The fork 104a fits around a pin 118 that is fixedly mounted on the free end 105a of the diaphragm lever 105 which is rockably journaled on a pivot 117. The free end of the diaphragm lever 105 is bent to extend forwardly or to the left as viewed in FIG. 5, thereby providing an abutment 105b in alignment with a pin 119 that is fixedly mounted on the free end of the auto-hinge 106 which is rockably mounted on a pivot 120 at its other end. The auto-hinge 106 is biased by a tension spring 121 to rotate clockwise about the pivot 120, but such a rotation is prevented by the engagement of the pin 119 thereon with the abutment 105b.

When the auto-hinge 106 is rocked counter-clockwise about the pivot 120 against the resilience of the spring 121, it presses against a diaphragm operating pin 122 which extends rearwardly, or to the right as viewed in FIG. 5, from a lens barrel 123, thereby operating the diaphragm.

A setting lever 124 is also rotatably mounted on the pivot 111, and has its free end 124a extending downward, with its foremost end being bent forwardly or the left as viewed in FIG. 5 to provide an abutment 124b. A charging spring 125 is anchored to and extends between the upper, lefthand portion of the setting lever 124 and a stationary member to urge it to rotate clockwise about the pivot 111. Upon winding the film, the abutment 124b of the setting lever 124 is moved by a charging member 126 that is interlocked with the film winding operation, for rocking lever 124 counter-clockwise about the pivot 111 to thereby charge the spring 125. The resilience of the charged spring 125 will be utilized when the shutter is closed.

The setting lever 124 and the diaphragm operating member 103 thus constructed are coupled together by a tension drive spring 127 which is disposed between a pin 114 fixedly mounted on a bulging edge 124c of the free end 124a of the setting lever 124 toward the base thereof and a pin 116 which is fixedly mounted on the left-hand projection 103b of the diaphragm operating member 103, and the drive spring 127 is energized by the counter-clockwise rotation of the setting lever 124 simultaneously with the energization of the charging spring 125.

A pin 128 is fixedly mounted on the free end 102a of the mirror drive member 102, and a tension spring 129 is disposed between the pin 128 and the pivot 115 for coupling the diaphragm operating member 103 and the mirror drive member 102 together.

Journaled on the outer end of the pivot 112a for the movable reflecting mirror 112 is a constraining lever 130 which has one arm 130a extending vertically downward, with a bevelled edge 130b formed at its extremity. The other arm 130c extends upward and then is bent to extend rearwardly or to the right as viewed in FIG. 5, and finally again bent so as to extend in a direction parallel to the pivot 112a, thereby forming a folded piece 130d. The constraining member 130 thus constructed is urged by a torsion spring 131 wound around the pivot 112a to rotate clockwise about the pivot 112a. However, such rotation of the constraining member 130 is normally prevented by the engagement of the bevelled edge 130b with the pin 128. The abutment of the pin 128 against the bevelled edge 130b is also effective to prevent a counter-clockwise rotation of the mirror drive member 102 under the action of the spring 129.

A solenoid M for operating the constraining lever is located adjacent to the folded piece 130a thereof. When the solenoid M is excited, its plunger Ma moves the folded piece 130d forward or to the left as viewed in FIG. 5, whereby the constraining member 130 rocks counter-clockwise about the pivot 112a against the resilience of the spring 131 to thereby free the pin 128 from the engagement with the bevelled edge 130b.

A pin 132 is fixedly mounted on the arm 130c in the portion between the upward extending portion and the folded piece, the pin 132 being operative to open a photometry trigger switch S located immediately above it. The switch S comprises a pair of movable contacts Sa, Sb formed of resilient conductive members, one of the movable contacts, Sa, extending to the left, as viewed in FIG. 5, of the pin 132. The switch S is normally closed, and is opened by the pin 132 upon rocking motion of the constraining lever 130 to thereby operate a photometric memory circuit.

Figure 6:
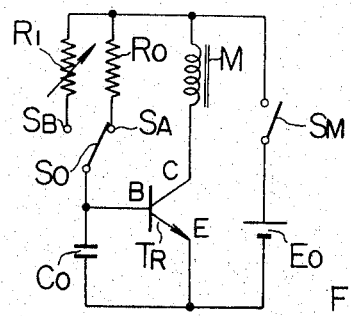
FIG. 6 is a circuit diagram showing one example of an electrical delay circuit applied to the diaphragm operating mechanism of FIG. 5.

The solenoid M is adapted to be excited by a solenoid controlling delay circuit which constitutes an electrical delay unit. As shown in FIG. 6, the delay circuit includes a capacitor and a resistor, the time constant of which determines the length of the delay time. Specifically, the circuit includes a parallel combination of a pair of series circuits, which combination is connected in series with a power supply Eo through a power switch SM. One of the series circuits comprises a resistor Ro and a capacitor Co, while the other comprises the solenoid M and a transistor Tr. The capacitor Co is connected across the base B and the emitter E of the switching transistor Tr, the collector of which is connected with one end of the solenoid M, whose other end is connected with the positive terminal of the power supply Eo through the power switch SM. The capacitor Co and the Resistor Ro are connected through a change-over switch So, which has a pair of contacts $S_A$ and $S_B$. When this switch is transferred from the contact $S_A$ to the contact $S_B$, the capacitor Co is connected in series with a self-timer resistor $R_1$ having a high resistance.

The power switch SM of the delay circuit is adapted to be opened and closed by the operation of the auto-hinge 106. As indicated in FIG. 5, the switch SM is located above the auto-hinge 106. The switch SM comprises a pair of movable contacts SMa, SMb formed of resilient conductive members, and normally one of the movable contacts, SMa is engaged by the forward end of the auto-hinge 106 and is urged rearwardly or to the right as viewed in FIG. 5 against its own resilience, thereby being separated from the other movable contact SMb to open the switch SM.

The second embodiment described above operates as follows. When the film is wound with the device in the condition shown in FIG. 5, the charging member 126 interlocking with he film winding operation urges the abutment 124b to the right, whereby the setting lever 124 is rotated counter-clockwise about the pivot 111. Thereupon, the charging spring 125 and the drive spring 127 are energized. In the position just described, the focussing is performed, and subsequently the release button is depressed, whereby the detent 108 is rocked clockwise about the pivot 109 to free the release lever 101 from constraint by the detent 108, thereby freeing the diaphragm operating member 103. As a result, the diaphragm operating member rotates counter-clockwise about the pivot 111 under the influence of the spring 127, pushing the pin 118 forwardly through the connection lever 104 to rock the diaphragm lever 105 clockwise about the pivot 117. The resulting motion of the abutment 105b causes the pin 119 to be moved forwardly, whereby the auto-hinge 106 is rocked counter-clockwise about its pivot 120 against the resilience of the spring 121.

As the auto-hinge 106 rocks, the pin 122 is pushed inward to set the diaphragm aperture for the purposes of photometry and taking a picture. In addition, as the auto-hinge 106 rocks, the movable contact SMa moves back into contact with the other movable contact SMb under the influence of its own resilience, thereby closing the powerswitch SM and operating the solenoid controlling delay circuit. Under this condition, the solenoid M is not yet energized, and the mirror drive member 102 is constrained by the engagement of the pin 128 thereon with the bevelled edge 130b.

Figure 7:
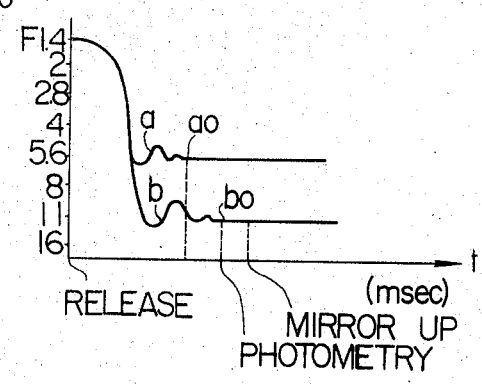
FIG. 7 shows operational curves of the diaphragm in the diaphragm operating mechanism of FIG. 5.

As mentioned previously, during the diaphragm aperture setting operation, the diaphragm blades (not shown) are rapidly moved, so that upon reaching the terminal point in the operation, the diaphragm blades will rebound to cause an instability of the diaphragm aperture for a small but definite period of time. FIG. 7 shows such diaphragm aperture setting operations in which the curve a depicts the operation when the diaphragm aperture is set to F 5.6 while the curve b depicts the operation when the diaphragm aperture is set to F 11. It will be noted that undulations occur upon termination of the setting operation which represent the rebounding of the diaphragm blades, and that the aperture is not stabilized until point ao or bo. However, in accordance with the invention, the solenoid controlling delay circuit has a delay time which corresponds to the period of time required for the diaphragm aperture to be stabilized from the beginning of the diaphragm aperture setting operation until it is completed and the rebounding has terminated. This period of time corresponds to the time constant of the series integral circuit comprising the capacitor Co and the resistor Ro in the delay circuit. This permits the photometry to be conducted after any rebounding of the diaphragm blades has been terminated, thereby preventing an error in the photometry as caused by the rebounding.

When the diaphragm aperture setting operation is completed, the voltage across the capacitor Co rises to a calue sufficient to cause conduction of the transistor Tr, and hence the transistor Tr conducts to energize the solenoid M (see FIG. 6). When the solenoid is energized, its plunger Ma is forced forward to push the foled piece 130d, whereby the constraining lever 130 is rocked counter-clockwise about its pivot 112a against the resilience of the spring 131. When the lever 130 rocks, the pin 132 opens the photometry trigger switch S to operate the photometric memory circuit, and the pin 128 is disengaged from the bevelled edge 130b to allow a counter-clockwise rotation of the mirror drive member 102 about the pivot 111 under the resilience of the spring 129. When the switch S is opened, the light which passes through the stabilized diaphragm aperture and is reflected by the movable reflecting mirror 112 is directed to the photometric circuit in which the photometry takes place instantaneously and the photometric value is stored in the memory circuit. Upon completion of the photometry, the mirror drive member 102 abuts against the pin 113, moving it upward along the slot 135 to rock the movable reflecting mirror 112 clockwise about its pivot 112a against the bias applied thereto. As the movable reflecting mirror 112 rotates, the light path of the finder is closed and the taking light path is opened. When the movable reflecting mirror 112 has completed its rotation, the shutter release is operated, whereby the first blind of the shutter starts to run, thereby initiating the exposure. From this time on, the electrical shutter operates and determines a proper exposure time automatically based on the stored photometric value. Upon lapse of the exposure time, the electrical shutter operates to run the second blind of the shutter to terminate the photographing process.

When the second blind of the shutter has run through its stroke, the constraint on the charging member 126 is removed so that it returns to the left (as viewed in FIG. 5) to its original position, whereby the setting lever 124 rocks clockwise about the pivot 111 under the resilience of the spring 125. As it rocks, the bulging edge 124c formed in the central region of the free end 124a of the setting lever 124 angularly moves the pin 116 fixed on the diaphragm operating member 103, so that the latter is also rotated clockwise about the pivot 111 to its original position. During the returning motion of the diaphragm operating member 103, the projection 103c angularly moves the pin 133 to rotate the mirror drive member 102 clockwise about its pivot 111 to its original position.

When the diaphragm operating member 103 rotates clockwise, the forward drive previously imparted from the connection lever 104 to the pin 118 is removed, whereupon the auto-hinge 106 rotates clockwise about its pivot 120 under the resilience of the spring 121 to return the diaphragm operating pin 122 to its original position. Concurrently, the pin 119 pushes the abutment 105b back, whereby the diaphragm lever 105 is returned to its original position shown in FIG. 5.

When the auto-hinge 106 returns to the original position, the switch SM is opened again, whereby the energization of the solenoid M is interrupted. As a consequence, the constraining lever 130 rotates clockwise about its pivot 112a under the resilience of the spring 131, so that the photometry trigger switch S is closed and the bevelled edge 130b again engages the pin 128 to constrain the mirror drive member 102.

When the mirror drive member 102 returns to the original position, the movable reflecting mirror 112 rotates counter-clockwise about its pivot 112a to its original position under the influence of the bias applied thereto. As the diaphragm operating member 103 rotates clockwise in its returning motion to the original position, the release lever 101 having its fork 101c fitting around the pin 110 is rocked counter-clockwise about the pivot 107 to engage the notch 101b with the detent 108.

In the above-described embodiment, when it is desired to apply a self-timer, the change-over switch So may be transferred from the contact $S_A$ to the contact $S_B$. In this instance, the capacitor Co is connected in series with the resistor $R_1$ having a high resistance, thereby providing a time constant circuit of increased time length. Such increased time length defines the time period of the self-timer, and upon lapse of such time, the solenoid M is energized to proceed with the photographing process in the normal sequence of photometry, the upward movement of the mirror and the exposure. The resistor $R_1$ for the self-timer may be made variable for the convenience of varying such time period.

Figure 8:
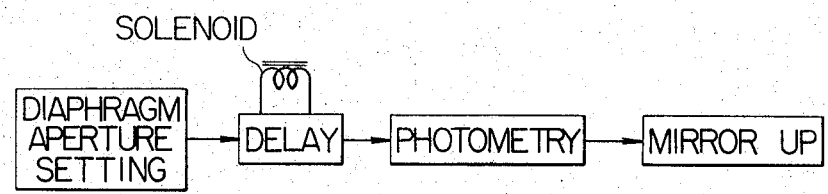
FIG. 8 is a block diagram of the electrical delay means of FIG. 5.

In this manner, in the embodiment of the invention, the process proceeds as illustrated in FIG. 8 wherein it will be noted that the diaphragm operating member 103 is cocked upon winding the film and is freed for movement upon depression of the shutter release to thereby operate the delay circuit and constrain the mirror drive member, and subsequently after the diaphragm aperture has been stabilized, the delay circuit operates to energize the solenoid M to free the mirror drive member from the constraint applied thereto to effect instantaneous photometry, followed by the movement of the movable reflecting mirror for taking a picture. Because the diaphragm operating member and the mirror drive member operate in a serial manner, the invention affords the same advantage as in open photometry of allowing the focussing to be effected in the open diaphragm condition while achieving the photometry with a preselected diaphragm aperture.

While in the embodiment described above, the torsion spring 131 which acts to rotate the constraining member 130 clockwise has been relied upon in order to prevent the counter-clockwise rotation of the mirror drive member 102 under the resilience of the spring 129, it will be appreciated that the delay circuit may comprise a Schmidt trigger circuit or the like and the torsion spring 131 may have a reduced resilience only sufficient to drive the constraining lever 130 for clockwise rotation, with the solenoid being chosen of the type in which it is held retracted when the solenoid is energized so that the solenoid is effective to act through the constraining lever 130 to prevent the counter-clockwise rotation of the mirror drive member 102, thereby allowing the rotation of the mirror drive member 102 upon interruption of the energization of the solenoid after the diaphragm aperture has been stabilized.

What is claimed is:
1. In a single-lens reflex camera having:
   a. an optical system with a focussing light path to a finder and a taking light path to the film;
   b. a diaphragm for setting the opening of said light paths;
   c. a photometry system for sensing incoming light on the focussing light path to said finder;
   d. a shutter for opening the taking light path to the film;
   e. a shutter release;
   f. a reflecting mirror disposed in said light paths for directing the incoming light to said focussing light path and said photometry system and movable to close said focussing light path and open said taking light path to the film upon the acutation of said shutter release; and
   g. a film winding mechanism; wherein the improvement comprises:
   h. diaphragm operating means for setting the opening of said diaphragm upon the actuation of said shutter release;

i. mirror drive means operatively coupled to said diaphragm operating means for moving said mirror out of the taking light path in response to the setting of said diaphragm;

j. delay means for delaying the operation of said mirror drive means until the setting of said diaphragm is stabilized; and k. switch means actuated at the termination of the operation of said delay means for instantaneously operating said photometry system.

2. A camera as in claim 1 further comprising a setting lever interlocked with said film winding mechanism for movement thereby and a drive spring connecting said setting lever with said diaphragm operating means for the energizing thereof.

3. A camera as in claim 1 further comprising spring means for operatively coupling said mirror drive means to said diaphragm operating means.

4. A camera as in claim 1 wherein said delay means comprises an operator on said reflecting mirror and pin means integrally mounted on said mirror drive means for engaging and driving said operator and displaced from said operator before the actuation of said shutter release so as to delay the operation of said mirror drive means on said reflecting mirror until after the termination of any rebounding which might occur after the diaphragm setting operation as a result of rapidly driving the diaphragm operating means.

5. A camera as in claim 1 wherein said delay means comprises an escape wheel operatively coupled to said mirror drive means and an anchor engaging said escape wheel.

6. A camera as in claim 5 further comprising a sector-shaped toothed wheel integrally mounted on the diaphragm operating means and coupled to said escape wheel for slowing down the operation of the diaphragm operating means so that the diaphragm blades will not rebound after the diaphragm aperture setting operation.

7. A camera as in claim 1 wherein said delay means comprises an electrical delay circuit including a CR-timer and a solenoid coupled to said mirror drive means.

8. A camera as in claim 7 further comprising a switching circuit in the delay circuit including a variable resistance for setting the delay time of said CR-timer.

9. A camera as in claim 1 wherein said delay means comprises a time constant circuit including a capacitor, a resistor, a switching transistor, and a solenoid coupled to the mirror drive means.

10. A camera as in claim 1 wherein said switch means is actuated in response to the operation of the diaphragm operating means.

* * * * *